United States Patent
Drumm et al.

(10) Patent No.: US 7,168,057 B2
(45) Date of Patent: Jan. 23, 2007

(54) TARGETED OPTIMIZATION OF BUFFER-TREE LOGIC

(75) Inventors: Anthony DeGroff Drumm, Rochester, MN (US); Brian Christopher Wilson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 10/920,087

(22) Filed: Aug. 17, 2004

(65) Prior Publication Data

US 2006/0041852 A1    Feb. 23, 2006

(51) Int. Cl.
*G06F 17/50* (2006.01)
*G06F 9/45* (2006.01)

(52) U.S. Cl. ............... 716/10; 716/1; 716/6; 716/9
(58) Field of Classification Search ............ 716/6, 716/10, 1, 9
See application file for complete search history.

(56) References Cited

U.S. PATENT DOCUMENTS

| | | | |
|---|---|---|---|
| 6,006,023 A * | 12/1999 | Higashida | 716/6 |
| 6,044,209 A | 3/2000 | Alpert et al. | |
| 6,367,060 B1 * | 4/2002 | Cheng et al. | 716/10 |
| 6,550,045 B1 * | 4/2003 | Lu et al. | 716/6 |
| 6,591,411 B1 | 7/2003 | Alpert et al. | |
| 6,681,373 B1 * | 1/2004 | Zolotykh et al. | 716/2 |
| 6,725,389 B1 * | 4/2004 | Tetelbaum et al. | 713/400 |
| 6,910,197 B1 * | 6/2005 | Nair | 716/6 |

* cited by examiner

*Primary Examiner*—Paul Dinh
*Assistant Examiner*—Magid Y. Dimyan
(74) *Attorney, Agent, or Firm*—Patterson & Sheridan, LLP

(57) ABSTRACT

Computationally efficient methods and systems for optimizing an integrated circuit (IC) design by targeting only a limited subsection of buffer trees in the buffer system for optimization are provided. By making intelligent decisions about which buffer trees to optimize, greater gains in design efficiency (e.g., as measured by reduced delays and/or wire length) may be realized at greatly reduced computational times when compared to conventional techniques that attempt to optimize each buffer tree.

16 Claims, 6 Drawing Sheets

TARGETED BUFFER TREE OPTIMIZATION SELECTION CRITERIA ⎯610

620
- 622 ☐ APPLY THRESHOLD SEMI-PERIMETER
- [BOUNDING RECTANGLE ▽]⎯624   AREA [      ]⎯626
- TARGET ONLY IF UNBUFFERED TOPOLOGY IS GREATER

630
- 632 ☐ APPLY THRESHOLD NUMBER OF NODES
- LOW [    ]⎯634    HIGH [    ]⎯636
- (DON'T TARGET)            (TARGET)

640
- 642 ☐ APPLY SLACK TIMING
- 644 ☐ NEGATIVE
- 646 ☐ LESS THAN    648 [    ] NS

650
- 652 ☐ APPLY WIRE LENGTH CRITERIA
- ABSOLUTE DIFFERENCE        RATIO
- MIN [    ]⎯654    MIN [    ]⎯657
- MAX [    ]⎯656    MAX [    ]⎯658

[ OK ]              [ CANCEL ]

FIG. 6B

TARGETED BUFFER TREE OPTIMIZATION SETUP ⎯600

- MAX RUN TIME [    ]⎯602    [HRS ▽]⎯604
- REBUILD TARGET LIST EVERY [    ]⎯606    [HRS ▽]⎯608
- 609 [ SPECIFY SELECTION CRITERIA ]

[ OK ]              [ CANCEL ]

FIG. 6A

TARGETED OPTIMIZATION OF BUFFER-TREE LOGIC

CROSS-REFERENCE TO RELATED APPLICATIONS

The present application is related to commonly-owned U.S. Pat. No. 6,044,209, entitled "Method And System For Segmenting Wires Prior to Buffer Insertion", and U.S. Pat. No. 6,591,411, entitled "Apparatus And Method For Determining Buffered Steiner Trees For Complex Circuits," each incorporated herein in their entirety.

BACKGROUND OF THE INVENTION

1. Field of the Invention

The present invention generally relates to circuit design methodologies and, more particularly, to improved buffer tree logic design and optimization.

2. Description of the Related Art

A prevalent method of digital logic design is the Application Specific Integrated Circuit (ASIC) design method. The ASIC design approach abstracts individual transistor configurations that perform certain logic functions (such as a two input "nand") into what is referred to as a "standard cell." A library of standard cells is typically created and provided by an ASIC library vendor, with predetermined characteristics for each of the ASIC cells. Besides functional characteristics, cells are made available with different physical traits such as input pin capacitance or output drive strength. An integrated circuit chip is created by interconnecting these cells by wires into a network, assigning locations for those cells on the chip and assigning specific routes to the wires. This network is represented as a netlist.

Typically, these standard cell implementations can be used by the logic designer with a set of automated design tools that perform a variety of tasks to implement an ASIC design. One such design automation task, commonly referred to as "physical synthesis" involves "placed" ASIC circuit components, where a "placement tool" has assigned real or approximate physical locations for individual cells, designating where those cells should be realized on the physical chip. The choice of what ASIC cells are used from the target ASIC library to implement the logic function has been typically made by a preceding tool referred to as "logic synthesis". Wires (conductive lines) interconnecting those cells to form a desired logic function may be logically present but may not have been assigned a physical topology at the time physical synthesis is performed. The physical synthesis tool, dealing with these "placed" ASIC circuit components, optimizes the circuit choices (e.g., selecting specific cells from the library) and their physical locations to satisfy various design criteria (e.g., particular timing, power dissipation, etc.). These optimizations are made while satisfying other requirements, such as physical constraints that no two ASIC cells can occupy the same location. This is the a basic minimum definition of a Physical synthesis tool; modern physical synthesis tools have come to include other design processes such as logic synthesis and placement.

One important optimization made by a physical synthesis tool is the addition of buffering logic to maintain the integrity of a digital signal being sent from one ASIC cell to another across a wire. As an electrical signal travels along a physical wire, the shape of the signal can become attenuated over distance such that it is difficult (since the transition from one logic value to another takes longer) or even impossible for a receiving ASIC cell to detect a logic change in a signal that is propagated too far. In an effort to reduce attenuation and achieve optimal time of flight for a logic signal, buffering ASIC cells are typically inserted on many nets (signal paths) in the design. This distribution of a logic value from one location in the design to others is generally referred to as "buffering" and is inclusive of distribution of the logic value and the complement of that value. The network of buffering and inverting cells are together referred to as a buffer tree or buffering network. Considering both true and complement distribution simultaneously is typically needed to attain the best resultant tree.

The performance of an ASIC circuit is often modeled by a static timing tool that reports what is the worst possible timing event that could take place across the circuit between elements. The quality of timing at any point in the design is usually expressed by the "slack" at that point, which is calculated as the time the signal needs to be at that point minus when it actually arrives at that point. A negative slack indicates a signal arrives at some location after it is needed. The buffering sub-system of ASIC design tools attempts to remove any points with negative slack by the strategic placement of buffers.

Optimizing a buffer tree's design (insertion and placement) is critical as the operating speed of ASIC designs continues to increase. Strategic placement of buffers can significantly reduce propagation delays caused by excessive wire length. This placement can be guided by simulations involving computations of signal propagation delay between cells. Accurate computations of propagation delay within a signal path, which are utilized in optimization algorithms to determine buffer locations, typically involve complex equations and can be time consuming. As ASIC designs often have several million placeable ASIC cells, as well as several million interconnecting wires, optimizing every signal path for an entire circuit can be very time consuming, taking days or even weeks. In some cases, various buffer optimizations may be made at various stages of the design (e.g., during logical modeling at the cell level), while the number of buffer trees is more manageable than in the finished design. However, such optimizations may prove sub-optimal when cells are combined to produce the finished product, or a larger tree.

Accordingly, what is needed is an improved technique for optimizing buffer trees within an integrated circuit that is computationally efficient.

SUMMARY OF THE INVENTION

The present invention generally provides computationally efficient methods, systems, and articles of manufacture for targeted optimization of buffering trees within an integrated circuit.

One embodiment provides a method of optimizing an integrated circuit design. The method generally includes (a) identifying buffer trees existing in the network, (b) applying one or more selection criteria to the identified buffer trees, (c) building a list of buffer trees targeted for optimization comprising a limited subset of the identified buffer trees that satisfy the selection criteria, and (d) performing one or more buffer optimization algorithms on one or more of the targeted buffer trees in the list.

Another embodiment provides another method of optimizing an integrated circuit design. The method generally includes (a) identifying buffer trees existing in the network, (b) building a list of buffer trees to target for optimization by, for each identified buffer tree, (i) determining if an area of a wire topology of the buffer tree without buffers exceeds a specified threshold area and the buffer tree with buffers exhibits negative slack timing, and (ii) if so, adding the buffer tree to the list, and (c) performing one or more buffer optimization algorithms on one or more of the targeted buffer trees in the list.

Another embodiment provides a computer-readable medium containing a program for optimizing an integrated circuit design. When executed by a processor, the program performs operations generally including (a) identifying buffer trees existing in the network, (b) applying one or more selection criteria to the identified buffer trees, (c) building a list of buffer trees targeted for optimization comprising a limited subset of the identified buffer trees that satisfy the selection criteria, and (d) performing one or more buffer optimization algorithms on one or more of the targeted buffer trees in the list.

Another embodiment provides a computer system for optimizing an integrated circuit design generally including a physical synthesis tool for placing logical components of the integrated circuit design and a buffer tree optimizer. The buffer tree optimizer is included with or works in conjunction with the physical synthesis tool and is generally configured to optimize the network by building a list containing a limited subset of buffer trees to target for optimization that satisfy one or more selection criteria and performing one or more optimization algorithms on the selected buffer trees.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 6A–6B illustrate exemplary graphical user interface (GUI) screens for configuring targeted buffer tree optimization, in accordance with embodiments of the present invention.

DETAILED DESCRIPTION OF THE PREFERRED EMBODIMENTS

Figure 1:
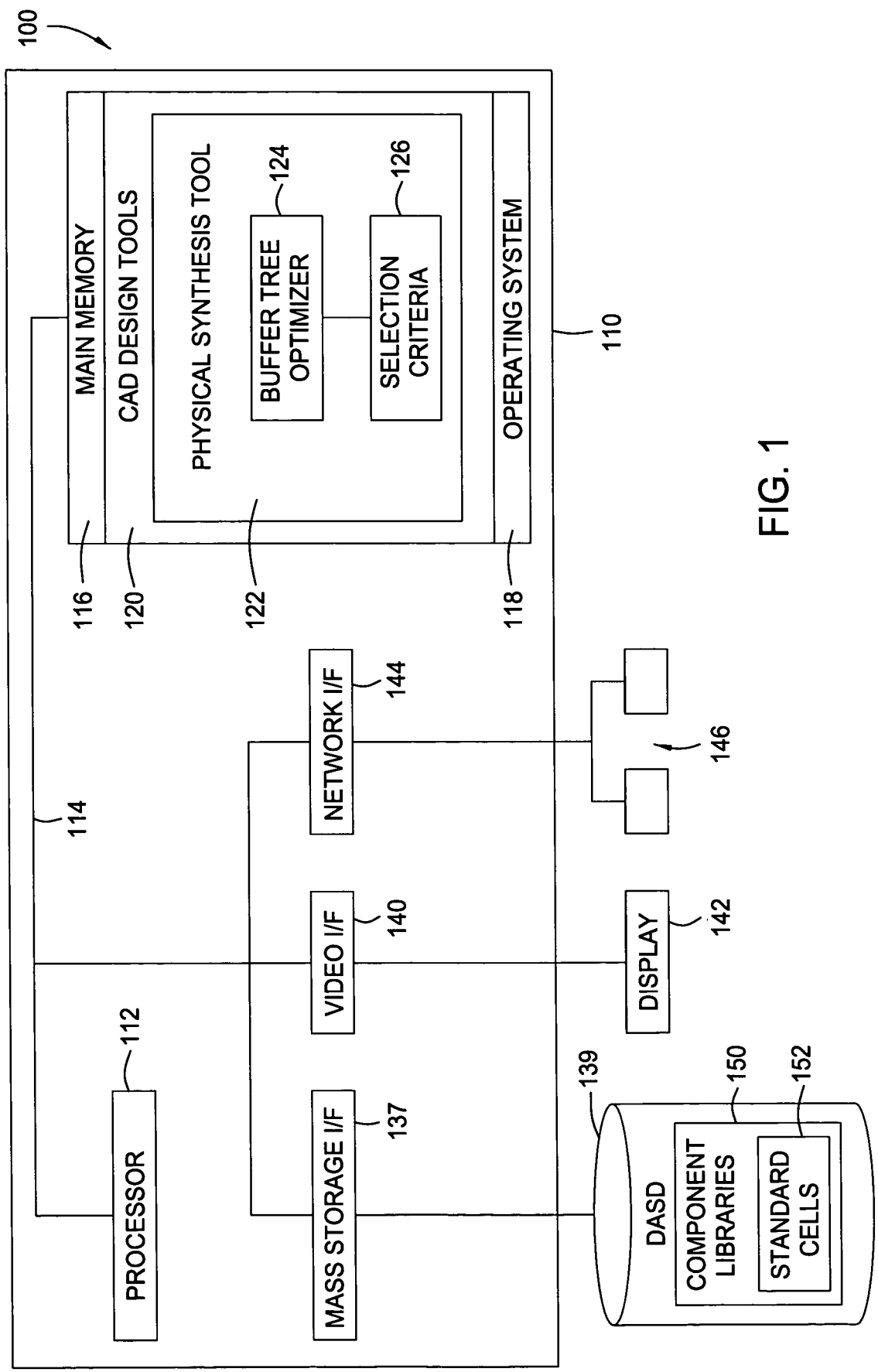
FIG. 1 illustrates an exemplary computer system in which embodiments of the present invention may be utilized.

The present invention generally provides computationally efficient methods and systems for optimizing an integrated circuit (IC) design by targeting only a limited subsection of buffer trees in the network for optimization. By making intelligent decisions about which buffer trees to optimize, greater gains in design efficiency (e.g., as measured by reduced signal delays and/or wire length) may be realized at greatly reduced computational times when compared to conventional techniques that attempt to optimize each buffer tree.

As used herein, the term buffer generally refers to any circuit device that may be used to assist in propagating a signal or an inverse of the signal. Accordingly, since non-inverting buffers are typically constructed of inverter pairs, the term buffer as used herein includes both non-inverting buffers and inverters. The term buffer tree generally refers to a collection of buffers located along signal paths between a common source node (a source) and one or more other sink nodes (sinks), regardless of whether such sink nodes receive an inverted or non-inverted version of a signal propagated from the source node.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product, such as a buffer tree optimizer 124 included with a set of computer aided design (CAD) circuit design tools 122, for use with the computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

AN EXPLANATORY SYSTEM

Referring now to FIG. 1, the computing environment 100 is shown. In general, the computing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer pSeries computer system available from International Business Machines (IBM) of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked workstations, servers, printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The memory 116 is shown configured with an operating system 118. The operating system 118 is the software used for managing the operation of the computer system 110. Examples of suitable operating systems include such as IBM's AIX, Unix, Microsoft Windows®, and Linux® (Linux is a trademark of Linus Torvalds in the US, other countries, or both). The memory 116 further includes one or more application programs, such as a physical synthesis tool 122, which may be part of a suite of CAD design tools 120.

The tools may be used by designers to design an application specific integrated circuit (ASIC) utilizing a set of standard cells 152 contained in a component library 150 supplied with the tools 120. As illustrated, the physical synthesis tool 122 may include a buffer tree optimizer 124 which may be configured to perform various operations described herein for computationally efficient optimization of buffer trees designed using the tools 120. As will be described in greater detail below, the buffer tree optimizer 124 may target for optimization, only a limited subset of buffer trees in a network, by applying a set of selection criteria 126. The selection criteria 126 are generally chosen in an effort to ensure that only those buffer trees that are likely to benefit from optimization are targeted.

Figure 2A:
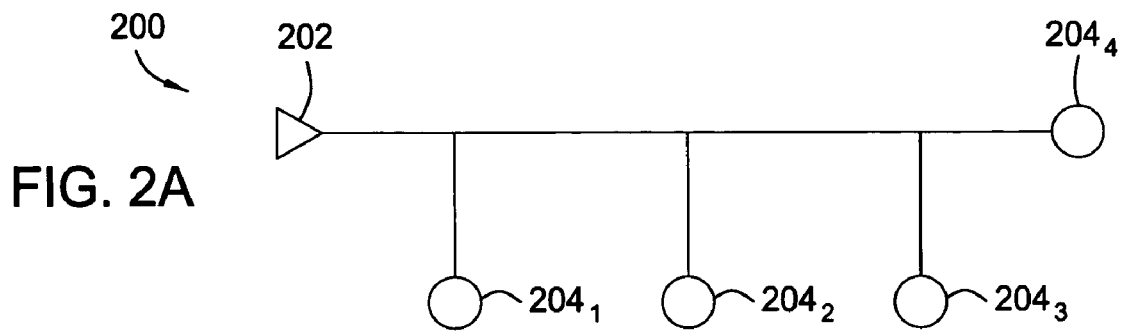
FIGS. 2A–2D illustrate exemplary signal routing trees which may be optimized in accordance with embodiments of the present invention.

FIGS. 2A–2D illustrates an example how different buffer trees may be used to route a signal from a source node to multiple sink nodes. The example assumes a single source node 202 and four sink nodes $204_1$–$204_4$. FIG. 2A illustrates the unbuffered tree 200, in which the signal is routed to the sink nodes $204_1$–$204_4$ with no buffers. While the unbuffered tree 200 has minimum wire length, the wire length between the source node 202 and one or more of the nodes 204 may be great enough that the signal transmitted thereto may be attenuated, thus compromising signal timing (e.g., creating negative slack).

Figure 2B:
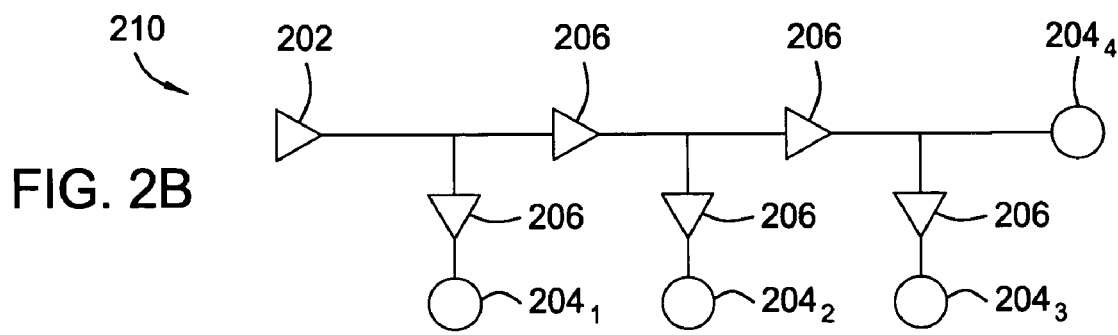
Figure 2C:
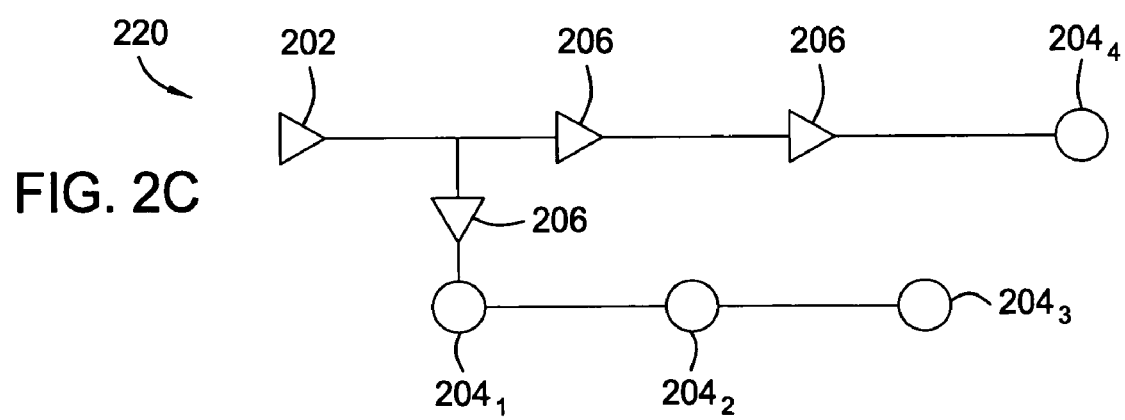
Figure 2D:
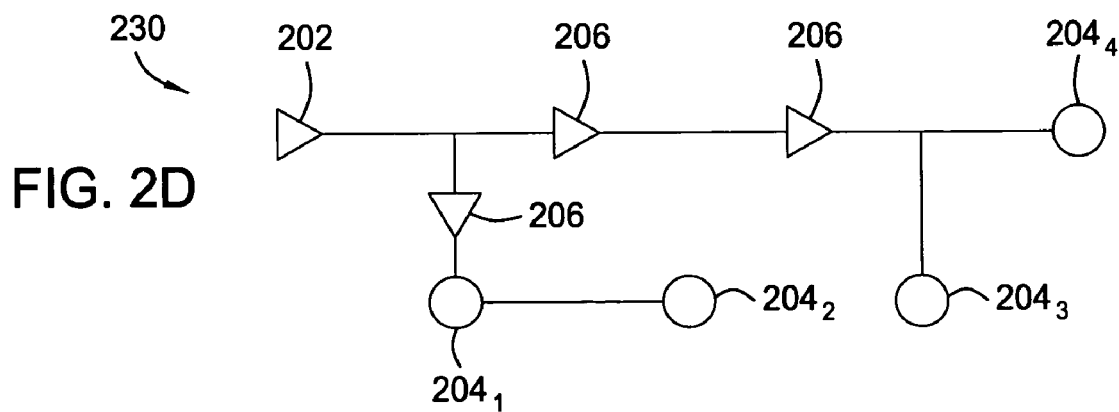

In order to improve signal timing, a group of buffers 206 may be inserted into the unbuffered tree 200, in various buffer tree configurations 210–230 shown in FIGS. 2B–2D, each with different impacts on timing, wire length, and/or total number of buffers 206. For example, the buffer tree 210 shown in FIG. 2B, has two buffers driving the signal to the (assumed) farthest sink node $204_4$, and an additional three buffers 206 to decouple the first three sink nodes $204_1$–$204_3$ from the sink node $204_4$. In contrast, the buffer tree 220 shown in FIG. 2C uses just one buffer 206 to decouple the sink nodes $204_1$–$204_3$ from the farthest sink node $204_4$. Finally, the buffer tree 240 shown in FIG. 2D represents a buffer tree in which sink nodes are, in effect, grouped with nodes $204_1$–$204_2$ grouped together and decoupled from nodes $204_3$–$204_4$. In general, which of the buffer trees 210–230 is optimum may depend on the particular design requirements (e.g., which, for any given buffer tree being optimized, may place a greater importance on reduced component count, overall wire length, or timing).

TARGETED BUFFER-TREE OPTIMIZATION

As previously described, ASIC designs often have several million placeable cells and several million interconnecting wires in a network. Often a quarter or more of the placeable cells comprise many tens of thousands of buffer trees. When a physical-synthesis tool starts its optimization there are many problems in the overall circuit that have to be addressed, including insertion or rearrangement of buffer trees. As each problem is fixed it will affect the quality of previous fixes and the need for other fixes in other locations in the circuit due to the interconnection of cells. Buffer trees that may have been acceptable at the time of insertion may no longer be optimal due to changes made in other connected logic. While it may be ideal to rebuild all buffer trees in the network after any other change it would take an extremely long amount of time. Embodiments of the present invention may be utilized to reduce processing time through efforts to make intelligent decisions regarding which buffer trees should be targeted for optimization. As a result, the total number of buffer trees optimized may be significantly reduced, thus reducing the required computing resources, with minimal impact on the overall efficiency gained by the optimization.

Figure 3:
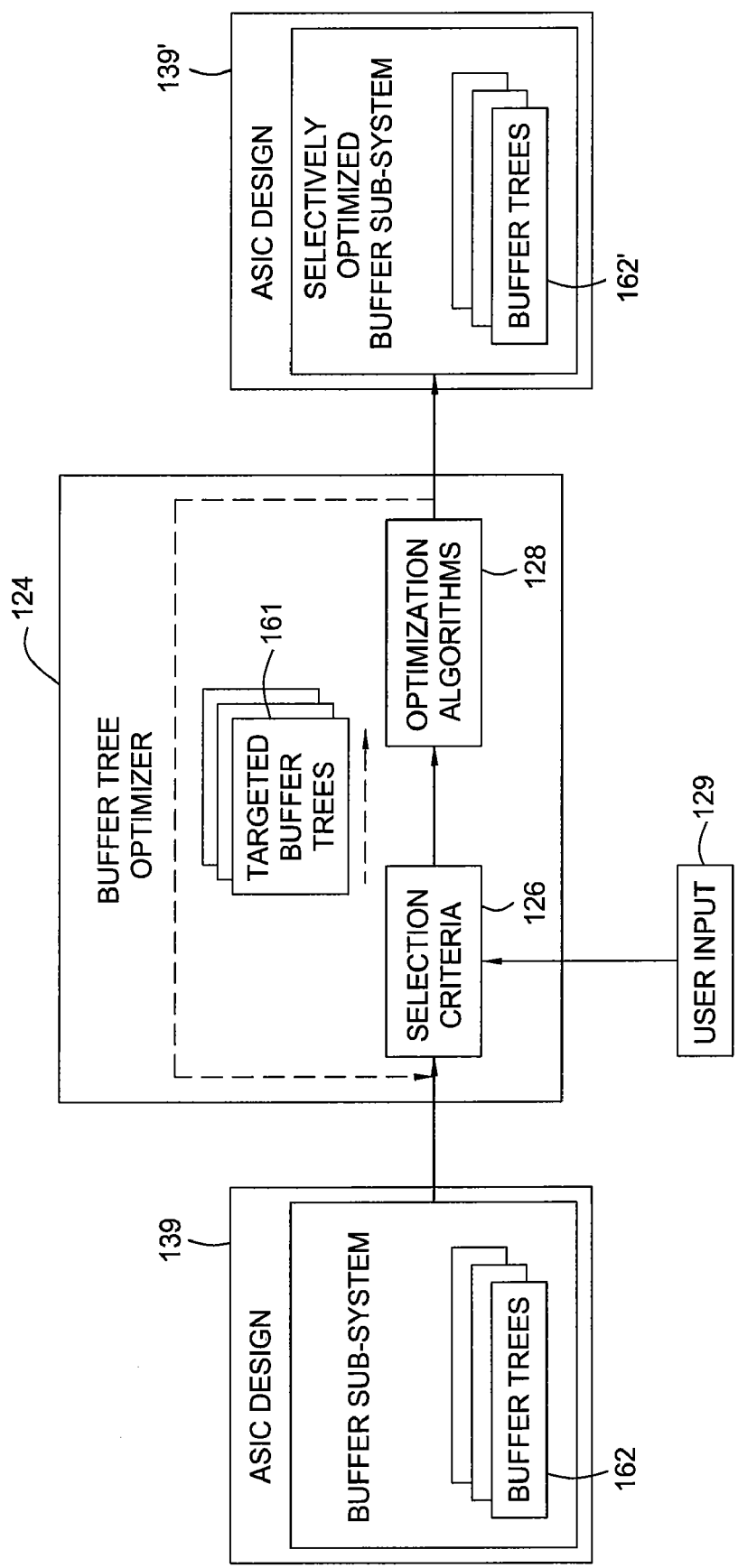
FIG. 3 is a logical block diagram illustrating operation of a buffer tree optimizer in accordance with embodiments of the present invention.

FIG. 3 is a logical block diagram illustrating operation of the buffer tree optimizer 124 that optimizes a limited group of buffer trees 162 contained in a circuit design 139. The buffer tree optimizer 124 may select, from the entire set of buffer trees 162, a limited number of buffer trees 161 to target by applying a set of selection criteria 126 to all the trees 162 in the design. As will be described in greater detail below, certain parameters affecting the selection criteria 126 may be determined by user input 129 (e.g., entered via a user interface provided as part of design tool).

One or more optimization algorithms are then applied to the targeted buffer trees 161, resulting in a selectively optimized design 139' in which a limited number of the buffer trees 162' have been optimized. The optimization algorithms 128 may include any suitable combination of one or more optimization algorithms. Examples of suitable optimization algorithms include those described in "Buffer Placement in Distributed RC-Tree Networks for Minimal Elmore Delay", by L. P. P. P. van Ginneken, Proc. International Symposium on Circuits and Systems, 1990, pp. 865–868, and the commonly owned U.S. Pat. No. 6,044,209, entitled "Method And System For Segmenting Wires Prior To Buffer Insertion," and U.S. Pat. No. 6,591,411, entitled "Apparatus And Method For Determining Buffered Steiner Trees For Complex Circuits," each incorporated herein in their entirety.

Figure 4:
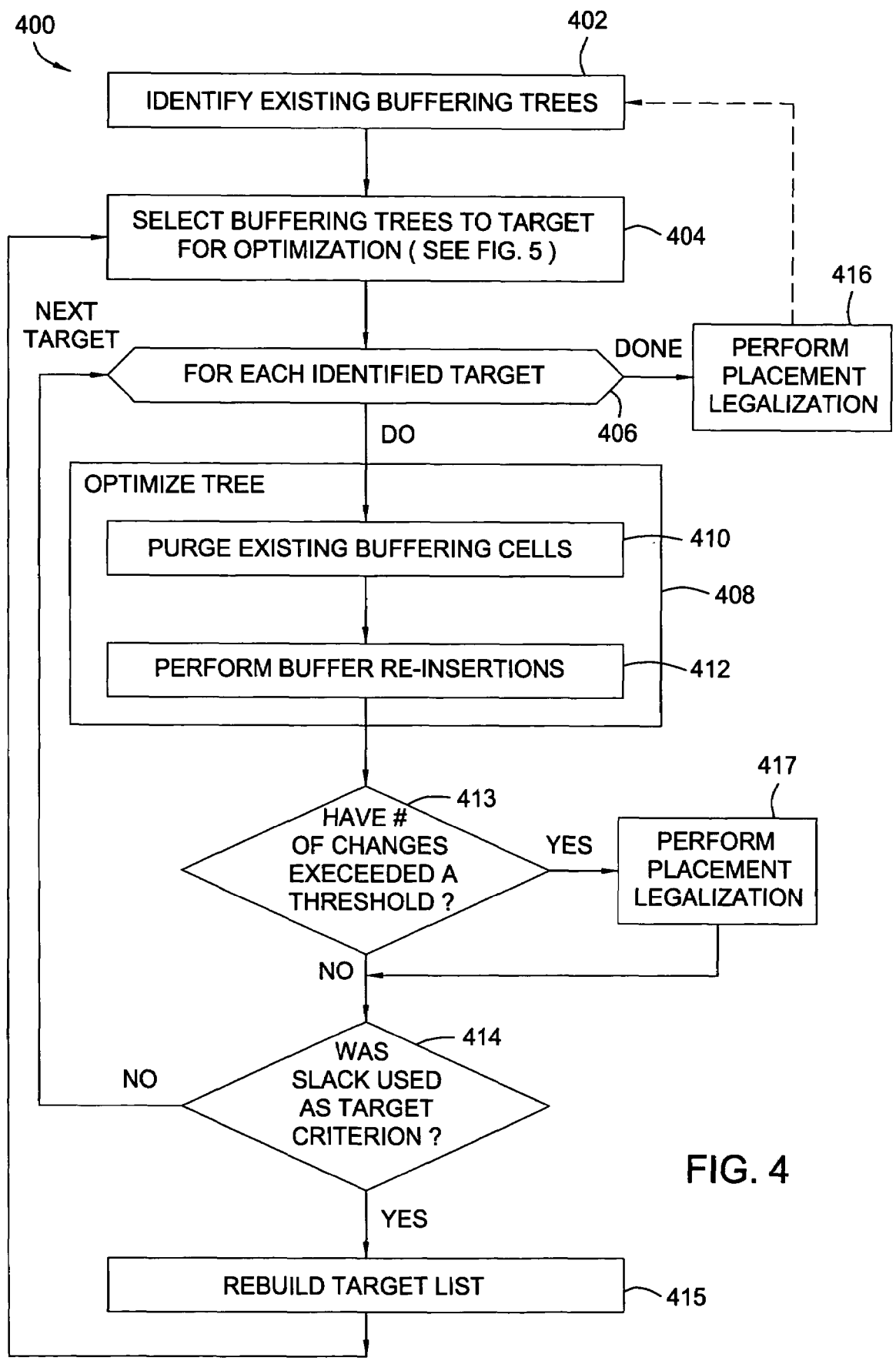
FIG. 4 is a flow diagram of exemplary operations for optimizing a limited subset of buffer trees in accordance with embodiments of the present invention.

FIG. 4 is a flow diagram of exemplary operations 400 that may be performed, for example, by the buffer tree optimizer 124 to optimize a limited subset of buffer trees in accordance with embodiments of the present invention. The operations begin, at step 402, by identifying existing buffer trees in the design. At step 404, a limited subset of the identified buffer trees to target for optimization are selected. Different selection criteria that may be applied to select the targeted buffer trees are described in detail below, with reference to FIG. 5.

Once the targeted buffer trees are identified, at step 406, a loop of operations 408–414 is entered, to be performed on each targeted buffer tree. At step 408, a selected buffer tree is optimized, for example, by purging existing buffering cells, at step 410 and performing buffer re-insertion, at step 412. Purging existing buffering cells may, in effect, remove the effects of any previous sub-optimal buffering that may have occurred at any previous design stage. The buffer re-insertion may be performed in accordance with any suitable optimization algorithm.

Due to the interdependence of many signals in the design, optimization of one buffer tree may have an effect on other buffer trees. As an example, a sub-optimal first buffer tree may contribute to negative slack for a signal at a node in a second buffer tree, causing the second buffer tree to be targeted. However, optimizing the first buffer tree may remove the negative slack detected in the second buffer tree and this second tree may be removed from the target list, which may speed overall optimization time. Accordingly, if slack is used as a target criterion, as determined at step 414, the target list may be rebuilt periodically, at step 415 (e.g., after some predetermined number of targeted trees has been optimized).

Once each of the targeted buffer trees has been optimized, placement legalization may be performed, periodically at step 417 and/or at loop completion in step 416 as required. As illustrated, for some embodiments, periodic placement legalization may be performed when a threshold number of changes to buffer trees has occurred, as determined at step 413. Placement legalization generally refers to detailed placement of circuit components, where local placement constraints, such as the removal of all physical overlaps, must be met. In other words, placement legalization typically involves movement of some components in an effort to fix their location in a legal manner. As legalization may result in movement of some components and changes to wire routing, the optimization process may be repeated, as indicated by the dashed lines in FIG. 4. In some cases, the optimization process may be repeated multiple times, with the location of different remaining components being legally fixed between each iteration.

In general, the optimization processing time should be reduced with each iteration, as the number of targeted buffer trees should be iteratively smaller. It should be noted that there may still be buffer trees that fail some of the criteria even after one or more iterations of performing the operations 400. For example, there may still be buffer trees that exhibit negative slack, indicating design problems that cannot be resolved through optimization. However, by reducing the optimization processing time by targeted optimization as described herein, such problems may be identified much more quickly, which may speed resolution of such and, overall time to market.

Figure 5:
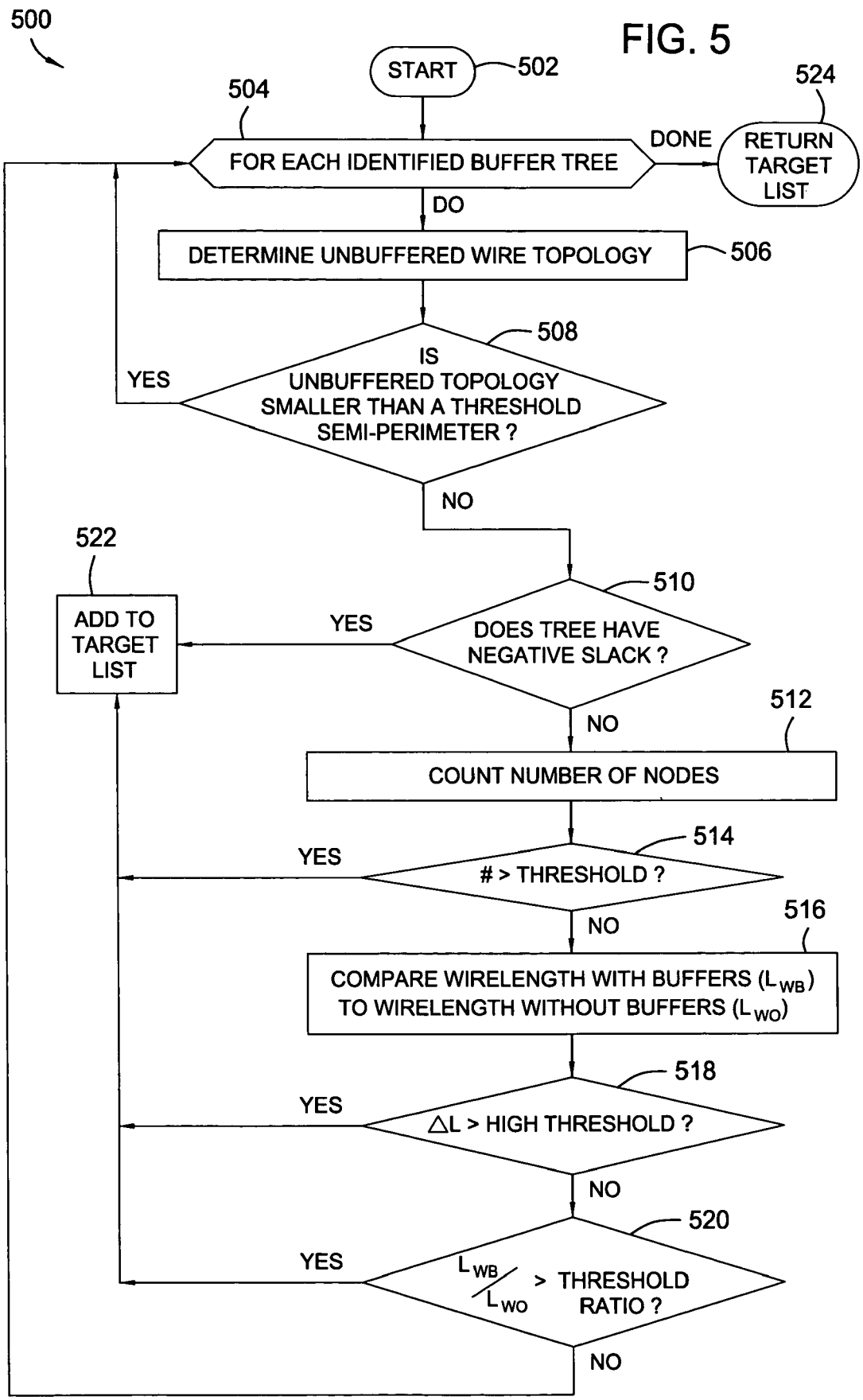
FIG. 5 is a flow diagram of exemplary operations for selecting a limited subset of buffer trees to target.

FIG. 5 is a flow diagram of exemplary operations 500 for selecting a limited subset of buffer trees, from a larger set of buffer trees, to target for optimization. It should be noted that the exact operations, and order in which they appear, are exemplary only. The particular operations performed, and in what order they are performed, will vary with different embodiments. Some embodiments may apply all of the criteria shown, others may apply only some (or none) of the criteria shown and may, in fact, apply different criteria. The criteria shown and described below are intended to illustrate the types of criteria that may be applied in an effort to identify buffer trees that are likely to benefit from optimization.

The operations 500 begin at step 502, and, at step 504, a loop of operations 506–520 is entered to be performed for each existing buffer tree. At step 506, the unbuffered wire topology (of a selected buffer tree) is determined. If this topology is smaller than a threshold perimeter (e.g., defined by a bounding rectangle), as determined at step 508, this buffer tree is not added to the target list. In other words, if the wire topology (the layout of wiring in the tree) does not occupy a minimum threshold area, it may be deemed that the tree is not likely to gain from optimization (e.g., there may likely be relatively little wire length and corresponding delay). If this threshold test is met, a determination is made, at step 510, as to whether the tree has negative slack. If so, the tree is added to the target list, at step 522.

Even if the tree does not have negative slack, it may still benefit from optimization, which may lead to reduced wire length, a reduced number of buffers, and the like. Therefore, at step 512, the number of nodes (e.g., buffers) is counted. If this number exceeds a predetermined threshold value, as determined at step 514, the tree is added to the target list. A large number of nodes in the buffer tree may indicate that several iterations of previous optimizations may have occurred (at earlier stages in the design) that may be less than optimal when taken together in the final design.

At step 516, the wire length of the tree with buffers ($L_{WB}$) computed as the sum of the net lengths of the individual nets comprising the tree is compared to the single wire length of the un buffered tree ($L_{wo}$). These wire lengths may be calculated as so-called Steiner lengths. For some embodiments, both the relative and absolute differences between the buffered and unbuffered wire lengths may be considered. In other words, a large ratio between the unbuffered and buffered wire lengths may not necessarily indicate a buffer tree will benefit significantly from optimization if the overall difference in wire lengths is short. On the other hand, a large difference between unbuffered and buffered wire lengths may indicate a buffer tree that will benefit from optimization, even if the ratio of lengths is close to one.

Accordingly, if the absolute difference in the buffered and unbuffered wire lengths is above a given (high) threshold absolute value, as determined at step 518, the buffer tree is added to the target list. Otherwise, if the ratio of unbuffered to buffered wire length is above a given (high) threshold ratio value, as determined at step 520, the tree may be added to the target list. While not illustrated, in some cases, if the absolute difference in wire lengths is below a given (low) threshold absolute value, the tree may not be added to the target list, regardless of the ratio between wire lengths. In other words, due to the relatively small absolute difference in wire lengths, optimization will likely result in only minimal gains.

Once each of the buffer trees has been considered, the target list is returned, at step 524, and the buffer trees in the target list that satisfy the specified selection criteria can be optimized in accordance with the operations shown in FIG. 4. As previously described, for some embodiments users may be able to configure operation of the buffer tree optimizer, including specifying selection criteria, via one or more user interfaces.

For example, FIG. 6A illustrates an exemplary graphical user interface (GUI) screen 600 that a user may be presented with to configure targeted buffer tree optimization, in accordance with one embodiment of the present invention. As illustrated, the user may be able to specify a maximum run time 602, which may be specified in various time increments (e.g., hours, days) via a pull down menu 604. The user may also be able to specify how often (or if) the target list is rebuilt, for example, by specifying a value in text box 606 and selecting units in pull down menu 608. For example, the user may be able to specify that the target list be rebuilt periodically, after a specified period of time, or after a certain number of buffer trees in a current target list have been optimized.

The user may also be able to specify selection criteria via a GUI screen accessible via a button 609, such as the exemplary GUI screen 610 shown in FIG. 6B. As illustrated, the user may be able to select whether various criteria, such as criteria related to a semi-perimeter (610), number of nodes (620), slack timing (630), or wire length (640) are applied. As illustrated, if a semi-perimeter threshold is applied, by selecting checkbox 622, the user may be able to specify a geometry 624 (e.g. a bounding rectangle, circle, etc.) and total area 626 (or radius) the unbuffered wire topology of a buffer tree must exceed before being targeted for optimization. If a threshold number of nodes is specified as a selection criterion, by checkbox 632, the user may be able to specify a minimum number of nodes (634) the buffer tree must have before it is considered as a target, as well as a threshold number of nodes (636) above which the buffer tree will be targeted.

If slack timing is specified as a selection criterion, by checkbox 642, the user may be able to specify whether negative slack is to be used as a criterion (checkbox 644). The user may also specify (checkbox 646) that a non-negative threshold slack (box 648) be used which may be useful, for example, to improve timing in cases where the slack approaches zero (although some tolerance may have already been considered when performing the slack timing calculations). If differences in buffered and unbuffered wire length criteria are to be applied (checkbox 652) the user may be able to specify minimum and maximum absolute differences (boxes 654–656), as well as minimum and maximum ratios (boxes 657–658). As previously described, a buffer tree may be targeted if the absolute difference exceeds the specified maximum value, regardless of the ratio, and may not be considered as a target if the absolute difference falls below the specified minimum value.

CONCLUSION

By targeting a limited number of buffer trees in an integrated circuit (that satisfy one or more selection criteria) for optimization, overall processing time required for buffer tree optimization may be significantly reduced. The selection criteria may be carefully specified in an effort target those buffer trees that are most likely to benefit from optimization (e.g., resulting in improved timing or reduced wire length). Thus, the overall efficiencies gained from the targeted optimizations may be substantially the same as those achieved by optimizing every buffer tree, while the processing time may be significantly reduced (e.g., by days).

While the foregoing is directed to embodiments of the present invention, other and further embodiments of the invention may be devised without departing from the basic scope thereof, and the scope thereof is determined by the claims that follow.

What is claimed is:

1. A method of optimizing buffer trees within an integrated circuit design, comprising:
   (a) identifying buffer trees existing in the design;
   (b) applying one or more selection criteria to the identified buffer trees;
   (c) building a list of buffer trees targeted for optimization comprising a limited subset of the identified buffer trees that satisfy the selection criteria;
   (d) performing one or more buffer optimization algorithms on one or more of the targeted buffer trees in the list; and
   (e) repeating operations (b)–(c) to re-build the list of buffer trees to optimize based on previously targeted buffer trees that have been optimized.

2. The method of claim 1, wherein the one or more selection criteria comprise at least one of the following:
   selection criteria related to the number of buffers or inverters in the buffer trees;
   selection criteria related to a comparison of wire length of the buffer trees with and without buffers; and
   selection criteria related to an area occupied by a wire topology of the buffer trees with and without buffers.

3. The method of claim 2, wherein the one or more selection criteria further comprises selection criteria related to slack timing of the buffer trees.

4. The method of claim 2, wherein:
   the selection criteria comprises selection criteria related to an area occupied by a wire topology of the buffer trees without buffers; and
   applying one or more selection criteria to the identified buffer trees comprises determining if the area occupied by the wire topology of the buffer trees without buffers exceeds a predetermined threshold area.

5. The method of claim 4, wherein only buffer trees whose wire topology without buffers exceeds the predetermined threshold area are targeted for optimization.

6. The method of claim 2, wherein:
   the selection criteria comprises selection criteria related a comparison of wire length of the buffer trees with and without buffers; and
   only buffer trees whose wire length with buffers exceeds the wire length without buffers by a threshold amount are targeted for optimization.

7. The method of claim 1, wherein performing one or more buffer optimization algorithms on one or more of the targeted buffer trees in the list comprises:
   purging existing buffers from the targeted buffer trees; and
   performing buffer re-insertion in accordance with the one or more buffer optimization algorithms.

8. A method of optimizing buffer trees within an integrated circuit design, comprising:
   (a) identifying buffer trees existing in the design;
   (b) applying one or more selection criteria to the identified buffer trees;
   (c) building a list of buffer trees targeted for optimization comprising a limited subset of the identified buffer trees that satisfy the selection criteria;
   (d) performing one or more buffer optimization algorithms on one or more of the targeted buffer trees in the list;
   (e) performing placement legalization operations for the integrated circuit design; and
   (f) repeating operations (b)–(c) to re-build the list of buffer trees to optimize based on previously targeted buffer trees that have been optimized.

9. A method of optimizing a buffer tree of an integrated circuit design, comprising:
   (a) identifying buffer trees existing in the buffer tree;
   (b) building a list of buffer trees to target for optimization by, for each identified buffer tree.
      (i) determining if an area of a wire topology of the buffer tree without buffers exceeds a specified threshold area and the buffer tree with buffers exhibits negative slack timing, and
      (ii) if so, adding the buffer tree to the list;
   (c) performing one or more buffer optimization algorithms on one or more of the targeted buffer trees in the list; and
   (d) repeating operations (a)–(b) to re-build the list of buffer trees to optimize based on previously targeted buffer trees that have been optimized.

10. The; A method of optimizing a buffer tree of an integrated circuit design, comprising:
   (a) identifying buffer trees existing in the buffer tree;
   (b) building a list of buffer trees to target for optimization by for each identified buffer tree,
      (i) determining if an area of a wire topology of the buffer tree without buffers exceeds a specified threshold area and the buffer tree with buffers exhibits negative slack timing, and
      (ii) if so adding the buffer tree to the list:
   (c) performing one or more buffer optimization algorithms on one or more of the targeted buffer trees in the list;
   (d) performing placement legalization operations for the integrated circuit design; and
   repeating (a)–(c) to further optimize the buffer tree.

11. A computer-readable medium containing a program for optimizing a buffer sub-system of an integrated circuit design which, when executed by a processor, performs operations comprising:
   (a) identifying buffer trees existing in the buffer tree;
   (b) applying one or more selection criteria to the identified buffer trees;
   (c) building a list of buffer trees targeted for optimization comprising a limited subset of the identified buffer trees that satisfy the selection criteria;
   (d) performing one or more buffer optimization algorithms on one or more of the targeted buffer trees in the list; and
   (e) repeating operations (b)-(c) to re-build the list of buffer trees to optimize based on previously targeted buffer trees that have been optimized.

12. The computer-readable medium of claim 11, wherein the one or more selection criteria comprise at least one of the following:
   selection criteria related to the number of buffers or inverters in the buffer trees;
   selection criteria related to a comparison of wire length of the buffer trees with and without buffers; and
   selection criteria related to an area occupied by a wire topology of the buffer trees with and without buffers.

13. The computer-readable medium of claim 12, with an additional selection criteria related to slack timing of the buffer trees.

14. The computer-readable medium of claim 12, wherein:
   the selection criteria comprises selection criteria related to an area occupied by a wire topology of the buffer trees without buffers; and
   applying one or more selection criteria to the identified buffer trees comprises determining if the area occupied by the wire topology of the buffer trees without buffers exceeds a predetermined threshold area.

15. The computer-readable medium of claim 14, wherein only buffer trees whose wire topology without buffers exceeds the predetermined threshold area are targeted for optimization.

16. The computer readable medium of claim 12, wherein:
   the selection criteria comprises selection criteria related a comparison of wire length of the buffer trees with and without buffers; and
   only buffer trees whose wire length with buffers exceeds the wire length without buffers by a threshold amount are targeted for optimization.

* * * * *